Patented Nov. 14, 1939

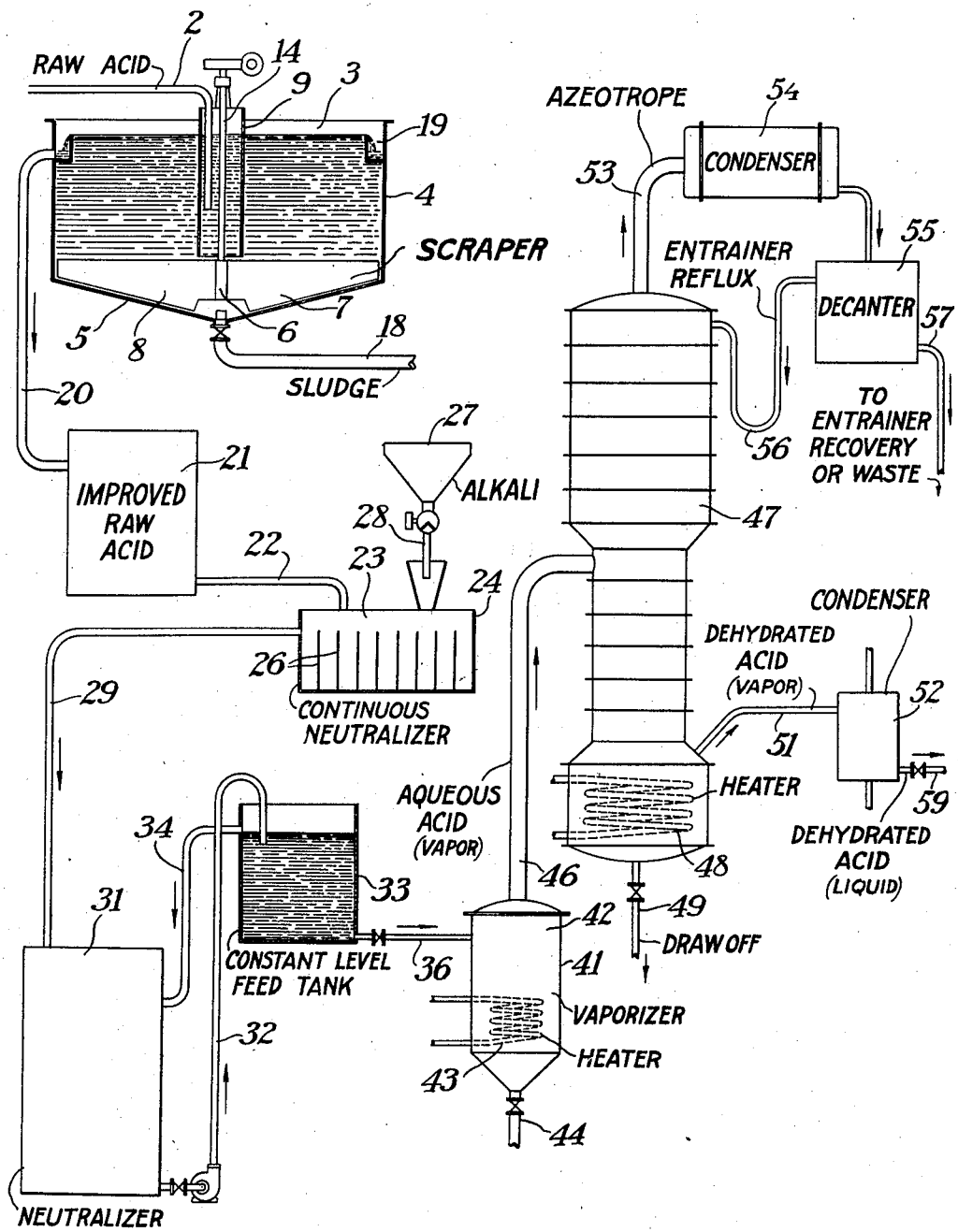

2,180,021

UNITED STATES PATENT OFFICE 2,180,021

PROCESS FOR RECOVERING ALIPHATIC ACIDS

Herbert G. Stone, Kingsport, Tenn., assignor, by mesne assignments, to Eastman Kodak Company, Rochester, N. Y., a corporation of New Jersey Application May 16, 1936, Serial No. 80,125

4 Claims. (Cl. 202—56)

This invention relates to a process for recovering aliphatic acids from impure aqueous mixtures and more particularly to a process for recovering acetic acid from by-product acetic aqueous solutions obtained in the manufacture of cellulose esters.

There are various sources of the aliphatic acids such as acetic acid, propionic acid and butyric acid. The acids may be obtained by chemical processes, fermentation and other ways. Generally, in commercial operations, the acids are obtained in the form of a more or less impure, turbid aqueous liquid. One common commercial source of aliphatic acids is in the form of a by-product liquid from the manufacture of cellulose esters. Before reuse it is generally necessary that the aliphatic acid be recovered from this impure and turbid material. For example, as described in Lipscomb's "Cellulose Acetate, Its Manufacture and Applications," large amounts of acetic acid containing liquid is produced in the manufacture of cellulose acetate. Cellulose acetate is precipitated and collected in a hydroextractor, washed and otherwise treated, producing large quantities of liquid comprising about 20% to about 40% of acetic acid with the balance principally water. This liquid obtained in commercial operations from this source and other sources, however, is not clear and pure but contains various components besides water and acid.

A number of processes have been devised for recovering the acid component, some of which are described in detail in Lipscomb. Many of these processes are concerned primarily with removing the water component by means of a withdrawing or entraining agent in a distillation unit. While the water component can be removed and the acid recovered in a fairly satisfactory state of purity, the distillation equipment or other apparatus employed, if fed directly with the crude commercial liquids, sooner or later becomes coated and clogged with deposits. Since distillation equipment generally includes bubble plates and other types of mechanism, disassembling and other procedure necessary for effective cleaning and repair entails considerable expense.

One object of this invention is to provide a process for treating impure sources of aliphatic acids to recover the acid therefrom. Another object is to provide a process for concentrating aqueous solutions of aliphatic acids wherein the life of the concentrating equipment is lengthened. Still another object is to provide a process for improving crude aqueous aliphatic acid prior to recovery by distillation. Still another object is to provide a process for the recovery of aliphatic acids from the acid by-product liquids produced in the manufacture of cellulose esters. Another object is to provide a process for recovering and concentrating acetic acid from the by-product acetic liquid produced in the manufacture of cellulose acetate. Other objects will appear hereinafter.

The aforementioned commercial sources of aliphatic acids, such as the acetic acid liquid from the manufacture of cellulose acetate, contain a certain amount of cellulose ester particles suspended, occluded or otherwise contained in the acid liquid. For example, some of these particles may be carried into the liquid during washing of the cellulose ester. Consequently, the turbidity and lack of clarity of the aforementioned by-product acid liquids are due to a large extent to this ester content. If the crude acid liquid is fed directly to the acid distillation equipment more or less of this material forms encrustations therein and otherwise hinders operation. Also, cellulose ester is lost in this fashion.

I have found that by giving the by-product acid liquid material a definite mechanical treatment to improve it, as will be described in more detail hereinafter, the improved acid may be fed into the acid recovery equipment and readily recovered.

My invention may be better understood by reference to the accompanying drawing. This drawing is a semi-diagrammatic side elevation showing an apparatus set-up for carrying out my invention. Certain parts of the apparatus have been shown in section, broken away, or on exaggerated scale for clarity.

In the accompanying drawing numeral 2 designates a feed conduit for the aliphatic acid material to be treated. This conduit leads to a mechanical device designated 3 for improving the crude acid liquid prior to recovery of the acid therefrom. The feed may be arranged to enter continuously at the surface near the center of the device or the feed may be caused to enter at some other suitable point, provided the desired result is obtained.

Device 3 may be any one of several types of construction. In the instance shown the device is comprised of a shell 4. This construction may be cylindrical and in the general nature of a large tank. Housed within the shell is a rotating element designated 6.

This element includes the plurality of arms 7, 8. These arms may, if desired, support paddles or fins which would be of a suitable shape and positioned so that upon rotation of the element 6 the paddles will contact the particles to be removed from the apparatus, such as by scraping off particles attached to the bottom 5. The arms are carried by the vertically extending shaft 14 to which a driving force and mechanism (not shown) may be applied. The arms of course, if desired, may be adjustably connected and braced by supports.

Various other constructions such as a large disk having paddles suspended therefrom and similar arrangements may be employed in place of the arrangement described provided the apparatus will function to remove the particles from the apparatus. Shaft 14 may be carried by the base 5 which furnishes a bottom closure for the tank. This base 5 is provided with a suitable drainage construction which is connected to a valved draw-off pipe 18.

Shaft 14 is loosely enclosed by the feed well 9, the purpose of which will be more apparent as the description proceeds.

The upper portion of the shell is equipped with an overflow trough or launder 19 by means of which treated liquid may be withdrawn from the vessel. Conduit 20 conects the launder with a tank 21. This tank is largely for the purpose of causing a more regular flow and preventing surges. Hence, it may be eliminated, if desired. Tank 21 is connected by conduit 22 to a continuous neutralizer 23.

Neutralizer 23 is comprised of the external shell 24, containing a number of baffles 26 for breaking up acid flow. An alkali feed hopper and spout 28 are arranged so that alkali material such as sodium carbonate, sodium hydroxide or potassium, barium, calcium or other salts may be fed into 23. This may be desirable in the event the raw organic acid contains mineral acid which may have been added in the cellulose ester production.

Conduit 29 connects neutralizer 23 with tank 31 wherein the neutralizing action may be allowed to proceed to substantial completion.

Tank 31 is connected by conduit 32 to a constant level feed tank 33, principally for the purpose of convenience of controlling the flow to the distillation equipment. Tanks 33 and 31 are inter-connected by overflow conduit 34 for maintaining a constant level in 33. Other arrangements of apparatus may be substituted.

Tank 33 is connected by valved conduit 36 to evaporator or vaporizer 41.

This evaporator comprises a shell 42, heating means 43 and a valved draw-off 44. It is possible to dispense with this exact type of arrangement but it is preferred to employ a vapor feed from an evaporator as shown. The top of the evaporator is connected by means of conduit 46 to a still designated 47.

This still includes heating means 48, a valved draw-off 49, acid off-take 51, equipped with condenser 52. The upper portion of the column still includes the vapor off-take 53 which leads to a condenser 54. The condenser is attached to a decanter 55 which is provided with a reflux line 6 that leads to the still. The decanter also includes a conduit 57 which may be attached to an entrainer recovery system.

In place of the distillation set-up just described, I may employ any of the distillation systems shown in U. S. Patent 2,028,800 or pending applications 744,250, now Patent 2,049,440 and 26,226, now Patent 2,049,441. The apparatus would be operated in accordance with the procedure set forth in the aforementioned patents and applications. That is, the column 47 would be charged with a suitable withdrawing agent such as butyl acetate-butyl alcohol or amyl acetate-amyl alcohol and operated for azeotropic distillation.

The functioning of the apparatus will be better understood by consideration of the following example which is set forth merely for the purposes of illustration.

An acid liquid containing from about 25–35% acetic acid resulting from the manufacture of cellulose acetate is fed into the apparatus through conduit 2. This acetic acid liquid is turbid and of a low clarity, due to various impurities such as suspended and occluded salts and fine particles of cellulose ester. If the liquid is fed directly into the distillation column, considerable trouble due to clogging and formation of the encrustations on the interior of the still might result.

The acid liquid entering through 2 may be introduced at the point shown or the feed may enter continuously at the surface somewhere near the center of the tank. The acid liquid entering through conduit 2, which is of small diameter as compared with feed well 9 and tank 3, is moving at considerable velocity. Therefore, the suspended or occluded cellulose acetate particles and other materials imparting bad clarity and which would clog the still are carried along in the inlet stream. However, the stream upon entering feed well 9 may be considered as being broken up into a great many non-distinct smaller streams with a considerable reduction of velocity of flow.

The broken up liquid therefore, in the example under description, will slowly flow radially from the vicinity of feed well 9 to the overflow 19. In other words, the fast-moving stream of liquid entering at 2 is converted to a slow-moving sheet of liquid which slowly overflows at 19 around the entire periphery of the tank. Generically, I refer to the aforementioned member 19 as a perpiheral gutter. As indicated, I prefer that this gutter extend around at least a major portion of the periphery and preferably around the entire periphery. I employ the term "peripheral" in accordance with usual practice to refer to an outer positioned member whether it be associated with a cylindrical, hexagonal, square or other shape tank. Rather suddenly reducing the velocity of flow of the liquid to a low velocity as described, substantially eliminates or reduces the force causing the suspended and occluded materials to be retained in the acid. Consequently, these particles separate out in tank 3. Any particles collecting on the bottom 5 may easily be removed therefrom by rotation of blades 7 and 8. By maintaining the valved line 18 open or intermittently opening this line, the particles will be flushed out of tank 3 by the pressure and flow of the large body of liquid above the bottom of the apparatus.

The material withdrawn at 18 generally comprises susbtantial proportions of cellulose ester which can be recovered and used in any of the usual ways for utilizing cellulose esters. Hence, there is considerable saving in this item which would otherwise be carried into the column and be lost by forming encrustations in the column.

The improved acid liquid is withdrawn or permitted to overflow at 19 into the conduit 20 and tank 21. Since the acid liquid is now relatively clear, it may be pumped at any desired velocity through the remainder of the system.

The mproved raw acid at 21, if originally from cellulose ester manufacture, may contain inorganic materials such as sulfuric acid, which has been added as a catalyst. This content would exert an injurious and corrosive action on the still, particularly under the heated condition of operation. Consequently, it may be desirable to add an alkali to the type above mentioned, to neutralize the undesired acid component. While we prefer addition as shown, this alkali treatment may, if desired, precede the acid improvement step in tank 3 so that if any additional occluded or suspended materials are formed, they will be removed in 3.

The neutralization reaction continues in tank 31. Acid liquid, which is now in greatly improved condition, is constantly fed through feed tank 33 and conduit 36 to vaporizer 41.

From here the vapors of acetic acid and water are caused to pass through conduit 46 into column 47. The use of the pre-evaporator and vapor feed is preferred since it imparts a certain amount of heat to the acid and water and lends itself to better control. However, liquid or other type of feed could be employed.

As already indicated, column 47 is charged with a withdrawing agent and the improved acid fed to column 47 is subjected to azeotropic distillation as in the manner set forth in the aforementioned U. S. patents and applications.

Concentrated acetic acid is produced which is recovered in the vapor form through conduit 51 and as a condensed liquid at 59. Water originally present with the acetic acid is carried out through conduit 53 by means of the withdrawing agent and distillation. This mixture is condensed in condenser 54 and permitted to settle into two layers in the decanter 55. At least a part of the withdrawing agent layer is returned through reflux 56 and the water layer may be discharged through conduit 57 to waste or to an entrainer recovery system such as shown in U. S. Patent 2,028,800.

In place of feeding the improved acid liquid into a pre-evaporator as described, the improved acid liquid may be fed into an extraction system and the acid extract thereafter subjected to azeotropic distillation in accordance with the procedure set forth in copending application Gordon and Conklin 744,251 now Patent No. 2,129,684.

My novel procedure of improving the crude acid liquid prior to subjecting it to distillation, or other procedure such as extraction, for recovery of the acid content possesses a number of advantages. The supervision and labor charges when operating in accordance with my invention and subjecting the crude acid liquid to a definite mechanical treatment are so low as to be negligible in consideration of the savings involved in eliminating expenses of cleaning and overhauling the equipment because of clogging and other interference with operation.

My novel procedure possesses a number of advantages over ordinary gravity treatment to remove suspended or occluded particles. Acid liquid cannot be as thoroughly and uniformly improved by ordinary gravity treatment as by my novel mechanical treatment. Improving the crude acid liquid as I have described, results in considerable saving as to floor space and capital invested in equipment. The acid obtained also tends to be more uniform. In addition, while velocity of flow of liquid is reduced at one part of the process, overall speed of operation is not materially decreased in my process.

While I have described my invention with respect to the acetic acid containing liquid resulting as a by-product in the manufacture of cellulose acetate and is particularly useful when applied to this source of acid, my invention has wider applications. A similar procedure may be applied to the by-product acid liquid resulting in the manufacture of other cellulose esters such as cellulose propionate, cellulose acetate propionate, cellulose butyrate and cellulose acetate butyrate, inasmuch as the corresponding by-product acid liquids in these processes will generally be in a state of turbidity and contain suspended and occluded particles. While I have shown one form of apparatus for producing a mechanical treatment on the by-product acid liquid which improves the acid liquid, my invention embraces other forms of definite mechanical treatment wherein the by-product acid liquid is freed from suspended and occluded particles.

Although I have shown and described certain specific embodiments of my invention I am fully aware that a number of modifications thereof are possible. Hence, my invention is not to be restricted except insofar as is necessitated by the prior art and by the spirit of the appended claims.

What I claim and desire to secure by Letters Patent of the United States is:

1. A process for recovering aliphatic acids, by procedure including distillation in a column, from crude aqueous acid-liquids containing suspended and occluded particles of cellulose ester which would deposit in the column during said distillation, which comprises substantially continuously feeding a stream of the crude aqueous liquid into a tank provided with a peripheral gutter, the tank containing a large and substantially quiescent volume of aliphatic acid-liquid, baffling said stream at the point of feed into the tank to avoid disturbing said quiescent volume of liquid, substantially continuously overflowing the surface layer of said quiescent volume of liquid into said gutter whereby the velocity of flow of the liquid in the tank is reduced and at least a major part of said particles are deposited in the tank as a sludge, removing sludge from the tank, substantially continuously withdrawing the improved acid-liquid in the gutter through conduit means, and subjecting said improved aliphatic acid-liquid to further treatment including azeotropic distillation.

2. A process for recovering aliphatic acids by procedure including distillation in a column, from crude aqueous aliphatic acid liquids containing particles of cellulose ester which would deposit in the column during said distillation, which comprises substantially continuously feeding a stream of the crude aqueous liquid into a tank provided with a peripheral gutter, the tank containing a large and substantially quiescent volume of the acid liquid, baffling said stream at the point of feed into the tank to avoid disturbing said quiescent volume of liquid, substantially continuously overflowing the surface layer of said quiescent volume of liquid into said gutter, whereby the velocity of flow of liquid in the tank is reduced and at least a substantial part of said particles are caused to be deposited in the lower part of the tank as a sludge, removing at least a part of the sludge from the tank and subjecting it to recovery treatment for obtaining valuable constituents therefrom, substantially continuously withdrawing the improved aqueous aliphatic acid liquid from which the sludge has been eliminated to further treatment including azeotropic distillation for obtaining a dehydrated aliphatic acid therefrom.

3. A process for recovering lower aliphatic acids, by procedure including distillation, from aqueous aliphatic acid liquids containing cellulose ester particles which may deposit during the distillation, which comprises substantially continuously feeding a small stream of the liquid into a tank having a peripheral gutter, the tank containing a large and substantially quiescent volume of aliphatic acid-liquid, baffling the feed at the point of introduction to avoid substantial disturbance of the large quiescent volume of liquid, substantially continuously overflowing into the gutter in the form of a thin film of liquid, the surface layer of the quiescent volume of liquid, whereby the velocity of flow of the liquid in the quiescent volume thereof is reduced sufficiently that at least the bulk of the aforementioned particles deposit as a sludge, substantially continuously conducting the withdrawn aliphatic acid-liquid to said distillation column and subjecting the liquid to azeotropic distillation for eliminating the aqueous component, and prior to this distillation incorporating a content of alkali therein for neutralizing any inorganic acid components therein.

4. A process for recovering acetic acid by procedure including distillation in a column, from crude aqueous acetic acid liquids containing suspended and occluded particles of cellulose ester which would deposit in the column during said distillation, which comprises substantially continuously feeding a stream of the crude aqueous acetic acid liquid into a tank provided with a peripheral gutter, the tank containing a large and substantially quiescent volume of acetic acid liquid, baffling said stream of acetic acid liquid at the point of feed into the tank to avoid disturbing the quiescent volume of liquid, substantially continuously overflowing the surface layer of the quiescent volume of liquid into said gutter, whereby the velocity of flow of the liquid in the tank is reduced and at least a substantial part of said particles are deposited in the tank as a sludge, removing the sludge from the tank, substantially continuously wthdrawing the improved acetic acid liquid in the gutter through conduit means and subjecting said improved acetic acid liquid to further treatment including azeotropic distillation for obtaining a concentrated acetic acid therefrom.

HERBERT G. STONE.